Figure 1:
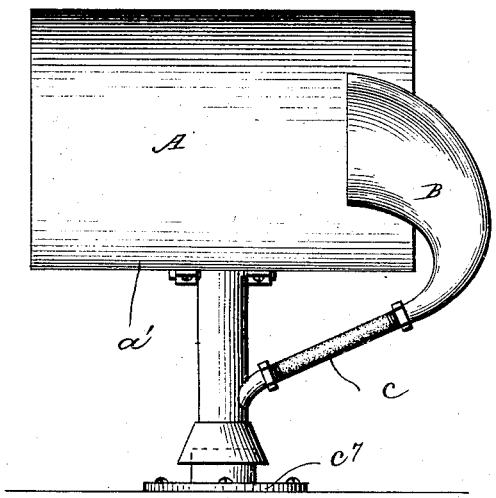

(No Model.)

F. DELLA TORRE.
EOPHONE.

No. 441,860. Patented Dec. 2, 1890.

Witnesses
E. L. Smith
Thomas Durant

Inventor
Frank Della Torre
By his Attorneys

UNITED STATES PATENT OFFICE.

FRANK DELLA TORRE, OF BALTIMORE, MARYLAND.

EOPHONE.

SPECIFICATION forming part of Letters Patent No. 441,860, dated December 2, 1890.

Application filed April 2, 1890. Serial No. 346,320. (No model.)

*To all whom it may concern:*

Be it known that I, FRANK DELLA TORRE, of Baltimore, in the State of Maryland, have invented certain new and useful Improvements in Eophones; and I do hereby declare the following to be a full, clear, and exact description of the same, reference being had to the accompanying drawings, forming a part of this specification, and to the letters of reference marked thereon.

My present invention relates to a new and improved apparatus for detecting and determining the direction or position of an object from which sounds emanate or are reflected, and is especially designed for use as an aid to navigation or for ascertaining the position of a more or less distant object at night, during foggy weather, or under similar conditions precluding visual observations.

As is well known, the navigation of vessels at night and during foggy weather is attended with great danger, owing to the extreme difficulty, if not impossibility, of locating or determining the position of objects, such as vessels, icebergs, the shore, and other obstacles. In such cases recourse is had to acoustic signals—such as fog-horns, bells, whistles, &c.—for indicating the presence of danger, such signals being either originated at the distant station or transmitted therefrom by reflection. Experience has demonstrated the unreliability of ordinary acoustic signals under such circumstances as a means for accurately determining the position of the vessel or other object from which the signal is sent, for while the general direction of the place from whence the sound proceeded may at times be fixed the margin of error is so great as to render the information thus derived unreliable and insufficient.

My present invention has for its object to provide means whereby an observer can quickly and with great accuracy determine the direction of the object or station from whence the acoustic signals are transmitted, and is thus enabled to locate the obstruction or other object. The principal elements of such an apparatus are two sound-receivers or collecting devices isolated the one from the other by a vertical partition or vane extending horizontally between said receivers, the whole mounted to turn about a vertical axis, together with means for separately conveying the sounds operating upon or through each receiver to the observer. Generally speaking, these devices are arranged for operation as follows: The partition or vane serves both as a reflector and a protection for the two receivers—that is to say, a receiver is located in proximity to each face or reflecting-surface of the partition and in such relation thereto that sound-waves striking the face of the partition at an angle to the plane thereof will be directed into or against the receiver appropriated to that side, while the receiver appropriated to the other or opposite side of the partition will be protected by the latter, and the sound-waves operating on the one side will thus be prevented from entering or acting upon said receiver on the opposite side, it being for the time in the acoustic shadow.

In order that the observer may readily determine which receiver is at any given time within the range of the signal and which in shadow, the receivers are provided with separate conveyers through which the sounds acting thereon are transmitted to the observer. The reflecting-surfaces of the partition or vane are arranged in substantially parallel planes, so that when the longitudinal axis of the vane or partition is brought parallel with a line drawn from the transmitting to the receiving-station the receivers on opposite sides will be equally exposed to the direct action of the sound-waves; but when the apparatus is turned about its vertical axis only one receiver and reflecting-surface will be exposed, the other being in the acoustic shadow of the sounds impinging upon the surface facing the transmitting station. By furnishing each receiver with a separate sound-conveyer the observer is enabled to at once and with certainty ascertain which reflecting-surface is for the time being exposed to the direct action of the sound-waves proceeding from the transmitting station, thereby determining the direction of the transmitting-station to be on that side of the longitudinal axis of the partition on which the responsive receiver is located. Having ascertained this fact, he moves the apparatus about its vertical axis until the opposite receiver is made responsive to the sound-waves, thereby locating the transmitting-station at a point intermediate the two positions from which observation had been taken. By moving the apparatus back and forth and carefully noting the alternate response of the two receivers, the observer is enabled to quickly adjust the apparatus so that the response or sounds transmitted from both receivers will be equal, and when this point has been ascertained and determined it will be found that the longitudinal axis of the partition or vane will stand on the line drawn from the transmitting to the receiving station, thus fixing the direction or position of the transmitting-station and enabling the navigator to approach or avoid it as may be desired.

The invention also comprehends, in addition to the general features hereinbefore outlined, certain novel details of construction tending to improve and enlarge the capacity of the apparatus, all as hereinafter more fully described.

Figure 2:
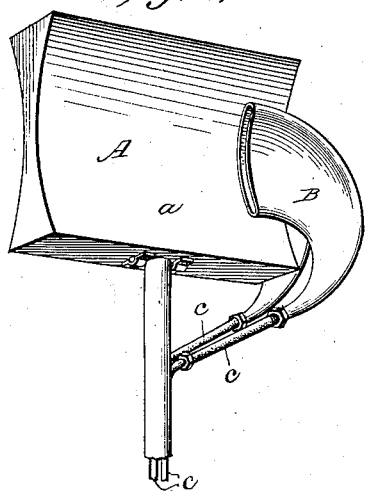
Figure 3:
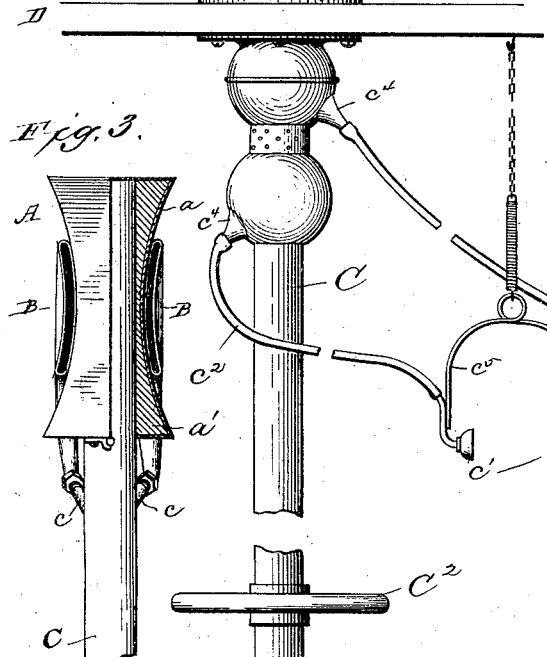
Figure 4:
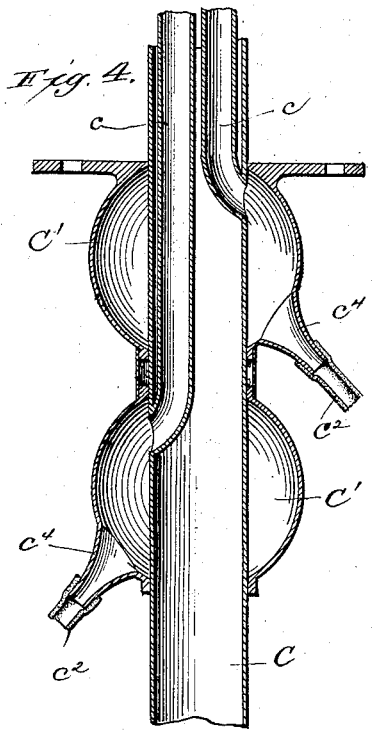

In the accompanying drawings, Figure 1 is a side elevation of the apparatus. Fig. 2 is a perspective view of the partition or reflector and receiver. Fig. 3 is an end view, partly in section; Fig. 4, a detail sectional view.

Similar letters of reference in the several figures indicate the same parts.

The portion of the apparatus hereinbefore referred to as a partition or vane is designated A, and the receivers B B, the whole mounted upon a shaft C, serving as a vertical axis, about which they are moved for adjustment.

The partition A is preferably constructed in the form shown, and comprises a head or block horizontally disposed and having its opposite parallel surfaces concaved vertically to increase the reflecting power. This concave form of the reflecting-surfaces is more especially valuable when the apparatus is designed for use on vessels and is subjected to the rolling action of the boat. The partition may be made solid or in sections, but is preferably formed of a hollow metallic case $a$, filled with or surrounding a light central core $a'$, and is secured at the center of its length to the vertical shaft C, so that it will present about the same surface to the wind on opposite sides of the axis and thus be in balance, thereby rendering it capable of being easily revolved about its axis. On each side and in close proximity to the reflecting-surfaces of the partition one of the receivers B is located, with its receiving-mouth at or near the rear end of the partition, so that sound-waves impinging upon said reflecting-surface will be directed toward and operate upon said receiver. In the present instance the receivers are in the form of receiving-trumpets having their mouths flattened and concaved to conform to the curvature of the concave side of the partition. This form of receiver is preferred, in that the mouth or entrance to the receiver is brought into close proximity to the reflecting-surface and stands at a slight angle to the front edge of the partition, thereby exposing the minimum surface for the action of sound-waves approaching the partition from the opposite side of the longitudinal axis. Other forms and kinds of acoustic receivers may be substituted for the trumpets shown—such, for example, as telephonic transmitters—but for ordinary use I prefer trumpets.

It is not essential, though desirable, that the partition and receivers be mounted to move in unison about the same axis, as they may, if desired, be arranged to move about independent axes. It is, however, necessary that they should both be movable to bring them to face the direction from whence the sound proceeds, and also that the partition should be movable laterally in the arc of a circle, either with or independently of the receivers, and about a pivot intermediate the two receivers, so as to cause the front portion of the partition to alternately uncover or expose one receiver and at the same time throw the other into the acoustic shadow.

The front face or edge of the partition is preferably formed flat or at an angle to the planes of the reflecting-surfaces, so that when the partition stands at but a slight angle to the direction of the sound-waves one of the flattened receivers will be protected, the edge of the partition serving to intercept or cut off the sound-waves.

Each receiver B is provided with a suitable conductor through which the sounds received by or acting upon it may be transmitted to the observer and in the apparatus illustrated, wherein trumpets are employed. Each of the latter is provided with a conveying-tube $c$, terminating in an ear-piece or receiver $c'$.

The conveying-tubes $c$ may be contained in part within the hollow shaft C, as shown, said tubes being connected at one end to the receiver and at the other to the ear-piece. When thus arranged—that is to say, when the conductor is carried through the shaft upon which the partition is supported—one of the internal tubes is arranged to open through the side of the hollow shaft C above the other, as shown in Fig. 4, and the outlet of each of said tubes $c$ communicates with the interior of a resonator C', preferably surrounding the shaft C and the flexible tubes $c^2$, attached to the ear-pieces $c'$, and each connected at one end to the outlet $c^4$ of one of said resonators. The resonators serve as collectors and amplify the sounds transmitted, so that they can be plainly heard and distinguished as the shaft rotates to change or adjust the position of the partition. The two ear-pieces $c'$ may, for convenience, be connected by a spring $c^5$, serving to clamp and hold them in contact with the ears of the observer, leaving his hands free to manipulate the partition A.

The shaft C is supported at its lower end in a step bearing or bracket $c^6$ and passes vertically through a bushing or bearing $c^i$, to steady the apparatus and permit of a free pivotal motion, and a hand-wheel $C^2$, or equivalent device, is secured to the shaft to facilitate the operation of turning and adjusting the apparatus.

It is desirable that the observer should be isolated or protected as much as possible from the direct action of the acoustic signals transmitted through the atmosphere, as his attention must necessarily be given to the sound-signals transmitted through or by the receivers B, and it is perhaps equally as desirable that he should be protected from the wind and weather, both of which may tend to impair or affect the organs of hearing. With a view to securing the requisite isolation and protection of the observer and thereby increase the efficiency of the service to be performed, the receiving portions of the apparatus—that is to say, the ear-pieces or other devices through which the signals are delivered to the observer—are located under cover below the deck or within a deck house or cabin, and the shaft C, carrying the partition and receivers B, is projected vertically through the deck or roof D, to which the upper bearing $c^i$ is secured. As thus arranged, the partition or vane A, together with the receivers B B, are located and sustained above the deck or roof D, and are exposed to the direct action of sound-waves traversing the atmosphere, while the observer is located below the deck or roof in comfortable quarters and can readily rotate or oscillate the partition A with its attachments by means of the hand-wheel or other devices, at the same time listening for sounds conveyed through the conductor from the receivers B, one of which—say that on the left of the partition—being in communication with his left ear and the other in communication with his right ear.

The resonators C' are held stationary and the shaft is permitted rotary motion within them, so that in whatever direction the shaft is turned each tube c will be maintained in open communication with its resonator.

The manner of operating the apparatus is, briefly stated, as follows: The observer being called upon or directed to ascertain the position of the object or station from which the acoustic signals are transmitted or reflected, he first applies the ear-pieces so that he can distinguish the sounds transmitted through the receivers B B, and, grasping the hand-wheel, turns the shaft and with it the partition until he hears the sound proceeding through one of the receivers B, thereby indicating that the face of the partition adjacent the receiver is facing the signal-station, but at at a greater or less angle to the line of movement of the sound-waves. Having obtained the general direction in which to look for the signal, he continues to move the partition around until the sound is rendered operative upon the other receiver B, thereby indicating that he has passed the signal-station, as the sound-waves which before operated on one side—say the right—are now received on the other or left side of the partition. He now knows that the signal-station lies at some point intermediate the positions in which the right-hand and left-hand receivers B responded. To ascertain more accurately the exact direction of the sound-waves and the position of the signal-station, he proceeds to rapidly vibrate the partition in the arc of a circle between the two extremes, gradually diminishing the excursions of the partition while continuing the alternations of the sounds transmitted through receivers B, until finally a point is reached when both receivers B respond equally and the partition is brought to rest with its longitudinal axis in line with the signal-station whose position was to be found. Experience has demonstrated that by this mode of procedure and with an apparatus constructed in accordance with the principles explained, it is possible to ascertain with great accuracy the position or point of the compass from which the acoustic signals heard at the receiving-station are transmitted.

The sensitiveness of the apparatus and its accuracy in locating the direction of the signals is increased when the vane or partition is rapidly vibrated to present the reflecting side alternately toward the signal-station, as by this means the apparent effect on the receivers is augmented by simultaneously throwing one receiver within the influence of the sound-waves and the other into the acoustic shadow, thus producing rapid transitions from sound to silence at the point where the observer is situated and listening, so that he can readily detect when one receiver is brought into action and the other thrown out of action, and in this way by gradually narrowing the range of motion he is enabled to quickly arrive at the neutral point, with the partition pointing toward the place from which the signals are transmitted.

Having thus described my invention, what I claim as new is—

1. A sound-locating apparatus provided with two acoustic receivers, each having a separate sound-conductor, and a vertical partition interposed between said receivers and movable laterally about a vertical axis.

2. A sound-locating apparatus provided with two acoustic receivers and an interposed laterally-movable vertical partition having a concave reflecting-surface in proximity to each of said receivers.

3. An apparatus such as described provided with a laterally-movable vertical partition with parallel reflecting-surfaces, and two acoustic receivers, one on each side of the partition, said receivers having vertically-elongated mouths or openings in proximity to the reflecting-surfaces of the partitions.

4. An apparatus such as described provided with a laterally-movable partition with concave reflecting-surfaces and acoustic receivers, one or more for each reflecting-surface, provided with concavo-convex mouths in proximity to said reflecting-surfaces.

5. The acoustic receivers and an interposed vertical partition mounted upon a vertical shaft.

6. The acoustic receivers and interposed vertical partition mounted upon a vertical shaft, said receivers being connected to separate sound-conductors contained within the shaft.

7. The vertical shaft carrying the two acoustic receivers and an interposed vertical partition, and provided with separate sound-conductors, each connected to one of the receivers, and the resonators surrounding said shaft and communicating with the sound-conductors carried thereby.

8. A vertical shaft mounted to turn in bearings and provided with two acoustic receivers separated by a vertical partition, two resonators with separate ear-pieces, and two sound-conductors, each of the latter communicating at one extremity with one of the acoustic receivers and at the opposite extremity with one of the resonators.

9. A sound-locating apparatus such as described, comprising two acoustic receivers and an intermediate vertical partition mounted to turn about a vertical axis, with separate sound-conductors extending from each of said receivers to an inclosed observation-chamber.

10. A sound-locating apparatus such as described, consisting, essentially, of two acoustic receivers and an intermediate partition, the whole mounted to rotate about a vertical axis and located in a position exposed to sound-waves traversing the atmosphere, with devices for controlling the movement or position of said apparatus, and separate sound-conductors connected to the two receivers, said controlling devices and the receiving portion of the sound-conductors being located within an inclosed observation-chamber.

11. A sound-locating apparatus such as described, the same consisting of two acoustic receivers and an intermediate vertical partition mounted upon a vertical shaft passing through the deck of a vessel or the roof of a chamber, said shaft being provided with devices by which the observer can rotate it, while the acoustic receivers are placed in communication with the observer through separate sound-conveyers.

12. Two acoustic receivers and an intermediate vertical partition, the whole centrally supported upon a vertical axis.

13. The described mode or method of locating the point from which acoustic signals proceed by vibrating a vertical partition in front of isolated acoustic receivers provided with separate sound-conveyers.

FRANK DELLA TORRE.

Witnesses:
WALTER S. WILKINSON,
JAMES C. G. UNDUCH.